INVENTOR
GARETH L. BIBBINS

United States Patent Office 2,906,007
Patented Sept. 29, 1959

2,906,007
SINTERED BEARING COMPOSITION

Gareth L. Bibbins, Holden, Mass., assignor to Norton Company, Worcester, Mass., a corporation of Massachusetts Application December 21, 1956, Serial No. 629,889

8 Claims. (Cl. 29—182.5)

The invention relates to cermets.

One object of the invention is to provide solid antifriction material of superior lubricating properties. Another object of the invention is to provide solid antifriction material which can operate at temperatures above those at which organic materials fail. Another object of the invention is to provide a strong anti-friction material. Another object of the invention is to provide a material which is both reasonably strong and reasonably refractory and not unreasonably brittle. Another object of the invention is to make anti-friction parts for jet engines, gas turbines and other apparatus operated at high temperatures, an example of such parts being a bearing cage. Other objects will be in part obvious or in part pointed out hereinafter.

Figure 1:
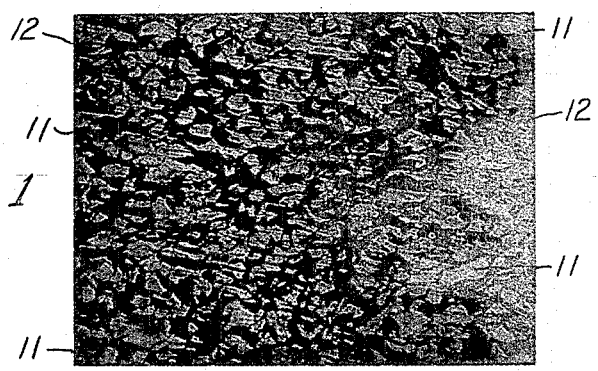
Figure 2:
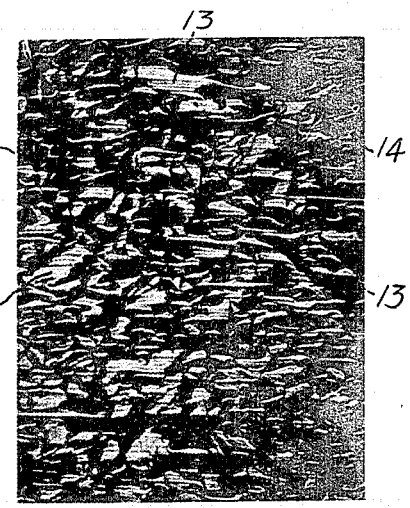
Figure 3:
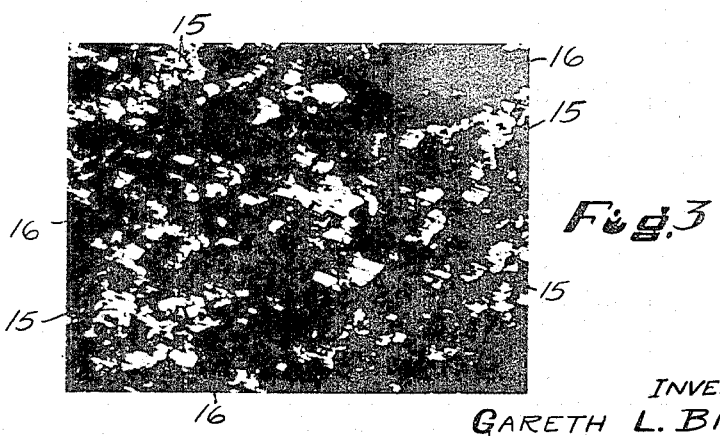

The accompanying drawings are photomicrographs in which,

Figure 1 shows a cermet according to the invention made out of 42.5 volume percent metal fiber, 7.5 volume percent metal powder and 50 volume percent boron nitride, Figure 2 shows a cermet according to the invention made out of 50 volume percent metal fibers and 50 volume percent boron nitride, and Figure 3 shows a compact made out of 50 volume percent boron nitride and 50 volume percent metal powder with no metal fibers.

The fairly recently coined word "cermet" is now in general use and one meaning thereof which is the meaning I intend is a combination of a metal and a ceramic. Metal of course includes alloy. In technical circles the word "ceramic" now has a broad meaning and includes simple compounds as well as more complex inorganic non-metallic materials such as silicates. According to this definition boron nitride, one of the components of my cermet, is a ceramic material. The other component of my cermet is metal or an alloy of metals which can be properly referred to by the generic term "metal."

I provide metal and boron nitride in the range of from 10% to 60% by volume boron nitride, the remainder metal. I use volume percentage definitions rather than weight percentage definitions because of the great differences between the specific gravities of the metals, and because the properties of my cermet depend upon the volumetric proportions of the components.

The particle size of this material should be 100 microns and finer, with no lower limit, as I can use the finest boron nitride now produced. Preferably at least 80% by volume of the boron nitride has a particle size less than 10 microns. However 10% by volume of this material can be agglomerates of larger particle size up to 500 microns. It must be understood, however, that today no boron nitride is being manufactured which, apart from agglomerates, has a particle size larger than about 5 microns, but I can tolerate 90% by volume up to 100 microns if as and when such material is available.

I have, in fact, provided boron nitride up to 100 microns by hot pressing boron nitride and crushing the hot pressed body and sizing it by screening to recover particles up to 100 microns. The coarser boron nitride particles greatly simplify the problem of obtaining frequent metallic contact points with the result that a cermet prepared using coarser particles of boron nitride has greater strength. It is apparent, therefore, that I can obtain greater lubricity, at some sacrifice of strength, by having a very fine dispersion of micron size boron nitride particles, or I can obtain greater strength with some sacrifice of lubricity by having a lesser dispersion of coarser boron nitride particles up to 100 microns.

I provide metal in the form of fibers at least 90% by volume of which has a ratio of length to diameter of at least 5 to 1. While I might use longer fibers, the difficulty of mixing the boron nitride uniformly with the fibers increase with the fiber length, and I find that 80 to 1 is a workable ratio; although in some cases, to provide greater strength, I have had fibers up to 250 to 1 ratio. These fibers should have an average diameter of from one ten thousandths of an inch to five one thousandths of an inch. Stating this in another way the average diameter of the fibers is from one tenth of a mil to five mils. Metal fibers as they are now prepared are not round. They are made by shredding wire and the cross section of many of the fibers is segmental but others have polygonal cross sections. A well understood derived meaning of "diameter" is the length of any straight line through a cross section and so such fibers have average diameters.

Another requirement of the metal fibers used to make the cermet of this invention is that the melting point should be 200° C. or above. The reason for this melting point requirement is that the principal application of my cermet is for the manufacture of bearings and cages for jet engines which have to operate at high temperatures. Of course a useable material can be made with fibers of any melting point but it would have few applications if they had a melting point below 200° C. Boron nitride doesn't melt, it sublimes at 3000° C. and so therefore the melting point of my cermet is the melting point of the metal thereof.

Substantially all of my cermet is inorganic material, treating graphite and carbon as inorganic, as is usually done. But this is my cermet as made; in many cases it will be desirable to impregnate it with lubricating oil which some people class as organic material.

I provide low melting point metal which has a melting point below that of the metal fibers having the lowest melting point. This metal can itself be in the form of fibers provided that in the heat treatment it is melted, but then of course it has ceased to be metal fibers and is dispersed through the cermet. This low melting point metal can also be in the form of powder. While the size of the metal powder particles is not critical, I prefer minus 100 size with no lower limit as when metal powders are made in finer particle sizes than they are made today, I can use them as well as I can use the finest metal powders now made.

The percentage of the metal in the form of fibers should be, by volume, from 25 to 90. The percentage, by volume, of the low melting point metal should be from 0 to 45, but preferably in a preferred form of my invention from 5 to 45.

Further in explanation of the low melting point metal constituent, in many embodiments of my invention it need not be provided at all. If it is in the form of fibers it either melts or it does not melt. If it has been melted it is no longer fibers. Presumably in the usual case only one kind of fibers will be provided, but if several different kinds are provided the melting point of the metal should be below that of the metal fibers having the lowest melting point. This statement can also be made if there is only one kind of metal fibers. That metal which is not in the final article in the form of fibers should have been melted in the preferred hot form of the invention. However, in some cases a large proportion of unmelted metal particles can be tolerated, if well sintered.

EXAMPLE I

I procured the materials given in the following table:

Table I

| Material: | Parts by volume |
|---|---|
| Steel wool, "Brillo," of 0000 size which is from .0001″ to .003″ diameter | 42.5 |
| Prealloyed bronze powder, 82% Cu, 18% Sn (by weight), minus 325 size | 7.5 |
| Boron nitride of unknown small micon size, not larger than above stated (5 microns) with practically no agglomerates | 50 |
|  | 100.0 |

These materials were thoroughly mixed and then molded under a pressure of 25 tons per square inch to form a bar. The bar was then sintered at a temperature of 950° C., which is well below the melting point of the fibers but above that of the prealloyed bronze. This completed the manufacture of this article. I tested this bar for strength and found that it had a modulus of 10,000 pounds per square inch. In a qualitative test, its anti-friction property was found to be strong.

Further examples are found in the following table, where the particle sizes of the materials are the same as in Table I, and the articles are pressed and sintered as in Example I. The numbers give the volume percentages of the several materials, and for each example, read down in a single column:

Table II

| Boron nitride, BN | 10 | 20 | 30 | 40 | 50 | 60 | 20 | 30 | 40 | 50 |
|---|---|---|---|---|---|---|---|---|---|---|
| Metal fibers | 90 | 75 | 60 | 45 | 30 | 25 | 80 | 70 | 60 | 50 |
| Metal powder | 0 | 5 | 10 | 15 | 20 | 15 | 0 | 0 | 0 | 0 |

It will be seen from the above examples that all over the range stated good cermets can be made. There are many different requirements for anti-friction material and in some cases strength is of little importance. In other cases strength is of major importance and lubricating qualities can be sacrificed in favor of strength.

Further examples are given in the following table constructed the same as Table II:

Table III

| | | | | | | | | |
|---|---|---|---|---|---|---|---|---|
| Boron nitride, 5 microns and finer | 50 | 50 | 50 | 50 | 50 | 50 | 60 | 10 |
| Medium carbon steel fibers, length diameter ratio mainly between 20/1 and 80/1 | 50 | 50 | 42.5 | 42.5 | 42.5 | 25 | 25 | 45 |
| Low tin bronze fibers, same ratio | 0 | 0 | 0 | 0 | 0 | 25 | 10 | 0 |
| Metal powder, bronze (Br), nickel (Ni) | 0 | 0 | Br 7.5 | Br 7.5 | Ni 7.5 | 0 | Ni 5 | Br 45 |
| Moulding pressure, tons/sq. in | 25 | 25 | 25 | 25 | 25 | 25 | 25 | 25 |
| Sintering temperature (° C.) | | 950 | 950 | | 950 | 950 | 950 | 950 |
| Sintering time (hours) | | 1 | 1 | | ½ | 1 | 1 | 1 |
| Hot pressing temperature (° C.) | 950 | | | 950 | | | | |
| Hot pressing, tons/sq. in | 2 | | | ¼ | | | | |
| Hot pressing pressure, time (minutes) | 5 | | | 5 | | | | |
| Coining pressure, tons/sq. in | 0 | 50 | 50 | | 50 | 50 | 50 | 50 |

Coining is an operation by means of which the density of a sintered compact can be increased beyond the sintered density by repressing at a pressure at least as high as the original pressing pressure and preferably as high as 50 tons per square inch. This second pressing operation closes any pores left following the sintering operation and improves the bonding of the metallic phase.

Boron nitride is inert in this manufacturing process so therefore after pressing and sintering any agglomerates originally present remain. Coining, however, to a large extent breaks them apart and improves the product. Furthermore the sequence of pressing, sintering and pressing again consolidates dispersions into a more homogeneous and compact structure and is desirable for this boron nitride metal complex since boron nitride mixes poorly with metal and the metal fibers are hard to mix with anything. Even in the case of hot pressing, the sequence of simultaneous pressing and heating followed by coining has a similar effect.

Further examples are given in the following tables; the pressing being done before sintering only and at 25 tons per square inch:

Table IV

| Material: | Parts by volume |
|---|---|
| Steel fiber, "Brillo" of 0000 size, as in Table I | 42.5 |
| Prealloyed silver solder powder, minus 200 mesh 25 Ag, 52 Cu, 23 Zn | 7.5 |
| Boron nitride as in Table I | 50 |

Sintering temperature, 950° C.

Table V

| Material: | Parts by volume |
|---|---|
| Steel fiber, as above | 42.5 |
| Prealloyed nickel phosphorus alloy, minus 200 mesh 88 Ni, 12 P | 7.5 |
| Boron nitride as in Table I | 50 |

Sintering temperature, 950° C.

Table VI

| Material: | Parts by volume |
|---|---|
| Stainless steel wool, "Brillo," "Fine" grade, fibers up to .005″ diameter | 50 |
| Boron nitride as in Table I | 50 |

Sintering temperature, 1100° C.

Table VII

| Material: | Parts by volume |
|---|---|
| Bronze wool, "Brillo," "Fine" grade, fibers up to .005″ diameter | 50 |
| Boron nitride as in Table I | 50 |

Sintering temperature, 650° C.

Table VIII

| Material: | Parts by volume |
|---|---|
| Aluminum wool, "Brillo," "Fine" grade, fibers up to .005″ diameter | 50 |
| Boron nitride as in Table I | 50 |

Sintering temperature, 500° C.

Table IX

| Material: | Parts by volume |
|---|---|
| Bronze wool as in Table VII | 50 |
| Boron nitride as in Table I | 25 |
| "Dixon" air-spun graphite particle size minus five microns | 25 |

Sintering temperature, 650° C.

Table X

| Material: | Parts by volume |
|---|---|
| Bronze wool as in Table VII | 50 |
| Boron nitride as in Table I | 25 |
| "Climax molybdenum" molybdenum disulphide unknown small particle size | 25 |

Sintering temperature, 600° C.

As will be seen from Table IX, my cermet may also include some graphite. As will be seen from Table X, my cermet may also include some molybdenum disulphide. Each of these materials is inorganic and each of them is platy and is a solid lubricant. They are compatible with each other and with boron nitride. In fact all three of these materials can be used together along with some metal fibers with or without the low melting point metal to make anti-friction bodies in accordance with this invention.

My cermets are refractory and are lubricating in the absence of any oil and have adequate strength. Graphite cermets become friction rather than anti-friction materials at elevated temperatures and molybdenum disulphide melts at 1185° C. My cermets are as refractory as the metal constituents thereof which in the case of steels is about 1500° C. Below this temperature graphite oxidizes and is abrasive in the presence of certain gases. One reason for the example including graphite is that it is less expensive to make and for low temperature applications the mixture is satisfactory and the same is true of molybdenum disulphide. Also the coefficient of friction is a function of combinations of materials unpredictable to exact parameters and there may be cases where the use of graphite and/or molybdenum disulphide would give superior results which is the main reason I include them.

But boron nitride will not form a coating on a mating member, whereas graphite will, and thus my cermets are in general superior to graphite cermets for many applications. Molybdenum disulphide anti-friction materials also form coatings on mating parts and frequently cause seizure. The absence of seizing characteristics is an important property of my cermets, while the inherent lack of strength of any article having a large proportion of boron nitride is compensated by the inclusion of the metal fiber constituent.

The cermet of Figure 1 was cold pressed at 25 tons per square inch and then hot pressed at 950° C. at ¼ of a ton per square inch, the pressure being maintained for 5 minutes at the temperature mentioned. A graphite mold was used. The areas marked 11 show the material resulting from the metal fibers which had alloyed with the metal powder. The dark areas 12 are boron nitride. The magnification on the Bristol board is 100.

In Figure 2 is shown a cermet which was similarly pressed at 25 tons per square inch and then hot pressed in a graphite mold at 950° C. at a pressure of ¼ of a ton per square inch maintained for 5 minutes at the temperature mentioned. In Figure 2 the light areas 13 represent what resulted from the fibers and the dark areas 14 represent the boron nitride. The magnification in Figure 2 is the same as in Figure 1, namely 100 on the Bristol board.

The compact of Figure 3 was not made according to the invention at all. It was made out of metal powder and boron nitride with no fibers. The volume percentages of all three compacts of the drawings were given herein before and in this case it was equal volume parts of the metal powder and the boron nitride. The compact was made by pressing the mixture at 25 tons per square inch and then hot pressing at 1200° C. for 5 minutes in a graphite mold at a pressure of ¼ of a ton per square inch. The light areas 15 represent the metal powder and the dark areas 16 represent the boron nitride. This photomicrograph makes it appear that there is more volume percent of boron nitride than of metal powder but this is due to tearing out of the material from the metal powder during polishing which itself shows how weak this cermet is. It is not according to the invention. The magnification was the same as in the other two cases.

The cermet of Figure 1 was made out of steel fibers, bronze and boron nitride and had a modulus of rupture of 21,000 pounds per square inch. That of Figure 2 was made out of steel fibers and boron nitride and had a modulus of rupture of 10,000 pounds per square inch. And the compact of Figure 3 was made out of cobalt powder and boron nitride and had a modulus of rupture of 3,400 pounds per square inch.

It will thus be seen that there has been provided by this invention a cermet in which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

I claim:

1. A sintered bearing composition consisting essentially of boron nitride and metal, the boron nitride being present in from 10% to 60% by volume, at least 90% by volume of said boron nitride having a particle size of less than 100 microns, from 25% to 90% by volume of said composition being metal fibers having a melting point of above 200° C., said metal fibers having an average diameter of between 0.1 and 5 mils and a length to diameter ratio not more than 250 to 1 and of at least 5 to 1 for at least 90% by volume of the fibers.

2. A bearing composition according to claim 1 in which at least 5% to 45% by volume of the total metal is metal having a melting point below that of the metal fibers having the lowest melting point.

3. A bearing composition according to claim 2 in which at least 80% by volume of the boron nitride has a particle size less than 10 microns.

4. A bearing composition according to claim 1 in which at least 80% by volume of the boron nitride has a particle size less than 10 microns.

5. A bearing composition according to claim 4 in which substantially all of the metal is said metal fibers.

6. A bearing composition according to claim 1 in which substantially all of the metal is said metal fibers.

7. A composition as claimed in claim 1 which contains, in addition to boron nitride and metal, 25% by volume of graphite.

8. A composition as claimed in claim 1 which contains in addition to boron nitride and metal, 25% by volume of molybdenum disulphide.

References Cited in the file of this patent

UNITED STATES PATENTS

| | | |
|---|---|---|
| 1,631,493 | Laise | June 7, 1927 |
| 2,116,399 | Marth | May 3, 1938 |

FOREIGN PATENTS

| | | |
|---|---|---|
| 733,061 | Great Britain | July 6, 1955 |

OTHER REFERENCES

Blackburn et al.: Journal of the American Ceramic Society, vol. 32, No. 3, 1949, p. 81.

Hamjian et al.: Journal of the American Ceramic Society, vol. 35, 1952, pp. 44–48.

Materials and Methods, November 1955, p. 98.